United States Patent
Lubke et al.

(10) Patent No.: US 9,115,789 B2
(45) Date of Patent: Aug. 25, 2015

(54) DOUBLE CLUTCH TRANSMISSION

(71) Applicant: ZF Friedrichshafen AG, Friedrichshafen (DE)

(72) Inventors: Eckhardt Lubke, Friedrichshafen (DE); Johannes Kaltenbach, Friedrichshafen (DE); Bernard Hunold, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/357,024

(22) PCT Filed: Nov. 15, 2012

(86) PCT No.: PCT/EP2012/072660
§ 371 (c)(1),
(2) Date: May 8, 2014

(87) PCT Pub. No.: WO2013/087334
PCT Pub. Date: Jun. 20, 2013

(65) Prior Publication Data
US 2014/0305239 A1  Oct. 16, 2014

(30) Foreign Application Priority Data

Dec. 13, 2011  (DE) .......................... 10 2011 088 396

(51) Int. Cl.
*F16H 3/08* (2006.01)
*F16H 3/093* (2006.01)
(Continued)

(52) U.S. Cl.
CPC .............. *F16H 3/093* (2013.01); *F16H 37/046* (2013.01); *F16H 3/006* (2013.01); *F16H 2003/0933* (2013.01); *F16H 2200/0073* (2013.01); *F16H 2200/0082* (2013.01); *Y10T 74/19233* (2015.01)

(58) Field of Classification Search
USPC ................................................... 74/330, 331
See application file for complete search history.

(56) References Cited

U.S. PATENT DOCUMENTS 4,658,663 A * 4/1987 Hiraiwa .......................... 74/359
6,209,406 B1 * 4/2001 Sperber et al. ................. 74/330
(Continued)

FOREIGN PATENT DOCUMENTS

DE  10 2005 044 068 A1  3/2007
DE  10 2007 021 990 A1  1/2008
(Continued)

OTHER PUBLICATIONS

German Search Report Corresponding to DE 10 2011 008 396.7 mailed Sep. 13, 2013.
(Continued)

*Primary Examiner* — Ha D Ho
(74) *Attorney, Agent, or Firm* — Davis & Bujold, P.L.L.C.; Michael J. Bujold

(57) ABSTRACT

A transmission having two clutches connected between a drive and respective transmission input shafts, one being hollow which supports the other within. A hollow countershaft which supports another countershaft therein. A main shaft arranged coaxially between the inner input shaft and an output shaft. Shifting elements can engage a variety of transmission connections in which transmission elements of the main group couple transmission elements of the range group which can couple the output shaft. The hollow countershaft has three fixed wheels which engage respective loose wheels, and the countershafts are rigidly coupled by a shifting element. With respect to this shifting element: an adjacent loose wheel rotates on and can rigidly couple the main shaft; a remote loose wheel rotates on and can rigidly couple the inner input shaft; and a central loose wheel rotates on and can rigidly couple at least one of the inner input and main shafts.

20 Claims, 2 Drawing Sheets

(51) Int. Cl.
 *F16H 37/04* (2006.01)
 *F16H 3/00* (2006.01)

(56) References Cited

U.S. PATENT DOCUMENTS

| | | | |
|---|---|---|---|
| 7,040,186 B2 * | 5/2006 | Pollak | 74/330 |
| 7,231,843 B2 * | 6/2007 | Gumpoltsberger et al. | 74/329 |
| 7,421,919 B2 * | 9/2008 | Gumpoltsberger et al. | 74/330 |
| 7,462,121 B2 | 12/2008 | Janson et al. | |
| 7,472,617 B2 * | 1/2009 | Nicklass | 74/340 |
| 7,500,411 B2 * | 3/2009 | Gumpoltsberger | 74/329 |
| 7,621,839 B2 | 11/2009 | Jakson | |
| 7,913,581 B2 | 3/2011 | Jackson | |
| 8,051,732 B2 | 11/2011 | Gitt | |
| 8,117,932 B2 * | 2/2012 | Bjorck et al. | 74/329 |
| 8,408,084 B2 | 4/2013 | Gitt et al. | |
| 8,419,582 B2 | 4/2013 | Renner | |
| 2004/0093972 A1 * | 5/2004 | Gumpoltsberger et al. | 74/325 |
| 2010/0192717 A1 | 8/2010 | Gitt | |
| 2013/0337961 A1 | 12/2013 | Kaltenbach | |

FOREIGN PATENT DOCUMENTS

| | | |
|---|---|---|
| DE | 10 2007 040 449 A1 | 3/2009 |
| DE | 10 2007 047 671 A1 | 4/2009 |
| DE | 10 2008 036 165 A1 | 2/2010 |
| DE | 10 2010 003 924 A1 | 10/2011 |
| DE | 10 2011 005 028 A1 | 9/2012 |
| WO | 2007/031193 A1 | 3/2007 |

OTHER PUBLICATIONS

International Search Report Corresponding to PCT/EP2012/072660 mailed Feb. 1, 2013.
Written Opinion Corresponding to PCT/EP2012/072660 mailed Feb. 1, 2013.

* cited by examiner

| | K1 | K2 | A | B | C | D | E | F | G | H | I | J |
|---|---|---|---|---|---|---|---|---|---|---|---|---|
| V1  | ● |   | ● |   |   | ● |   |   |   |   | ● |   |
| V2  |   | ● |   |   |   | ● | ● |   |   |   | ● |   |
| V3  | ● |   |   | ● |   | ● |   |   |   |   | ● |   |
| V4  |   | ● | ● |   |   |   |   |   | ● |   | ● |   |
| V5  | ● |   |   |   | ● |   | ● |   |   |   | ● |   |
| V6  |   | ● |   |   | ● |   |   |   |   |   | ● |   |
| V7  | ● |   | ● |   | ● |   |   |   |   |   | ● |   |
| V8  |   | ● |   |   |   |   |   |   |   | ● |   |   |
| V9  |   | ● |   |   | ● |   | ● |   |   |   |   | ● |
| V10 | ● |   | ● |   | ● |   |   |   |   |   |   | ● |
| V11 |   | ● |   | ● | ● |   |   |   |   |   |   | ● |
| R1  | ● |   |   |   |   |   | ● | ● |   |   | ● |   |
| R2  |   | ● | ● |   |   |   | ● | ● |   |   | ● |   |
| R3  | ● |   |   |   |   |   | ● | ● |   |   | ● |   |
| R4  | ● |   | ● |   |   |   | ● | ● |   |   |   |   |
| R5  |   | ● |   |   |   |   | ● | ● |   |   |   | ● |
| R6  | ● |   |   | ● |   |   | ● | ● |   |   |   | ● |

Fig. 2

DOUBLE CLUTCH TRANSMISSION

This application is a National Stage completion of PCT/EP2012/072660 filed Nov. 15, 2012, which claims priority from German patent application serial no. 10 2011 088 396.7 filed Dec. 13, 2011.

FIELD OF THE INVENTION

The invention concerns a dual-clutch transmission.

BACKGROUND OF THE INVENTION

Dual-clutch transmissions having two clutches, whose input sides are connected to a drive input shaft and whose output sides are connected respectively to one of two transmission input shafts arranged coaxially with one another, are known in various versions. In these, one transmission input shaft is in the form of an outer, hollow shaft radially inside which the other transmission input shaft, in the form of a solid shaft, is arranged. Furthermore, in such a dual-clutch transmission it is known to arrange a drive output shaft coaxially with respect to the drive input shaft and to provide one or two countershafts. Such dual-clutch transmissions have the advantage that in a sequential series of gearshifts they can basically be powershifted, since in each case a gear associated with one of the clutches is active while a subsequent gear associated with the other clutch is pre-selected, and the gearshift is carried out by opening and closing the two clutches with a time overlap. In this way dual-clutch transmissions enable gearshifts to take place largely without traction force interruption and with a high level of driving comfort.

Dual-clutch transmissions are also known which have upstream splitter groups and/or downstream range groups, by virtue of which the number of gears in the main transmission can be multiplied. These group transmission designs are particularly appropriate for commercial vehicles, for example long-haul trucks, which on the one hand need a large number of gears with a correspondingly large transmission spread and on the other hand should provide a good level of driving comfort and high operational reliability. However, in transmissions designed in this way not all the gears can be powershifted. In particular, when—as is usual—the range group is designed to be shifted between two gear ranges, although it is true that most or all of the gears within the two gear ranges are made as powershift gears, the process of shifting between the range groups themselves cannot as a rule be carried out while maintaining the traction force. Moreover, since this shifting operation takes a comparatively long time, the gearshift in the main transmission and the shift in the range group, including the requisite synchronization processes, result, in the case of the gearshifts concerned, in on the whole lengthy shift phases in which the traction force is reduced or interrupted, these phases having a noticeably adverse effect on driving comfort.

From DE 10 2010 003 924 A1 a dual-clutch transmission is known, which has two transmission input shafts arranged coaxially with one another, a main shaft coaxial with and axially behind the input shafts, an upstream splitter group and a downstream range group. In this transmission two countershafts are arranged with mutually parallel axes. The range group is in the form of a simple planetary gearset in which the sun gear is connected to the output end of the main shaft and the planetary carrier is coupled on the output side to a drive output shaft. To engage a lower gear group with a short gear ratio in the slow range, the ring gear can be coupled to a positionally fixed component, and to engage an upper group with a direct transmission between the main shaft and the drive output shaft, the ring gear can be coupled to the planetary carrier. A radially inner one of the two transmission input shafts can be connected directly to the input end of the main shaft. On the main shaft is additionally arranged a hollow shaft on which at least one loose wheel of a forward gear is mounted to rotate, which loose wheel can be connected in a rotationally fixed manner to the main shaft by means of a shifting element. The hollow shaft can be connected by means of shifting elements to the main shaft and/or to the planetary carrier. The gears of this known transmission can at least predominantly be powershifted. In particular, by virtue of the connectable hollow shaft the range group can also be powershifted.

From the previously unpublished DE 10 2011 005 028 A1 a dual-clutch transmission which has two clutches is known, the input sides of which clutches are connected to a drive input shaft while their output sides are connected, respectively, to one of two transmission input shafts arranged coaxially with one another, and in which two countershafts arranged coaxially with one another and a range group are also provided. The two countershafts are respectively in the form of a hollow shaft and a solid shaft, with the solid shaft arranged radially inside the hollow countershaft. The clutches with the input shafts form in each case a partial transmission with a plurality of gears that can be engaged. The gears can be coupled to a drive output shaft via the associated countershaft of the partial transmission concerned and via a main shaft connected to a sun gear of the range group. The drive output shaft is positioned coaxially with the two transmission input shafts and is connected to a planetary carrier of the range group. On the input side, the planetary carrier is connected to a non-shiftable loose wheel of a wheel plane axially adjacent to the range group. The non-shiftable loose wheel meshes with a shiftable loose wheel arranged on the radially inner of the two countershafts. Thereby, at least one gear can be coupled to the drive output shaft independently of the range group. In this way a power path to the drive output is produced, which is independent of a range group shift so that all the forward gears can in particular one involving a range group shift in a sequential gearshift series be powershifted. With seven wheel planes, this dual-clutch transmission provides nine forward gears and two reversing gears.

From DE 10 2007 047 671 A1 a further dual-clutch transmission with two clutches is known, whose input sides are connected to a drive input shaft and whose output sides are connected, respectively, to one of two transmission input shafts arranged coaxially with one another. The dual-clutch transmission also comprises two countershafts arranged coaxially with one another and a range group in the form of a planetary gearset. The two countershafts are respectively in the form of a hollow and a solid shaft with the hollow shaft mounted to rotate on the solid shaft. By means of a shifting device that can be actuated on two sides, depending on the shift position of the shifting device, either the outer countershaft can optionally be connected to the inner countershaft in a rotationally fixed manner, or a loose wheel can be coupled, again in a rotationally fixed manner, to the inner countershaft. An element of the main group of the transmission, preferably a gearwheel, and an element of the range group of the transmission, preferably a planetary carrier, can be connected to one another by means of a coupling device. A drive output shaft is connected rotationally fixed to the planetary carrier. A gear of a lower gear range of the range group and a gear of an upper gear range of the range group can be formed at the same time, in such manner that the respective shifting clutches are closed but the associated powershift clutches, namely the input clutches of the dual clutch, are still open. The two transmission gears from the lower and upper gear ranges can also be engaged at the same time, in which case the powershift clutches are closed and the drive torque is transmitted in parallel by the gears in such manner that one of the two gears is selected, which then remains engaged, while the other transmission gear is disengaged. In this case a shift in the range group takes place under load.

A comparable dual-clutch transmission, but with two axis-parallel countershafts, is also known from DE 10 2008 036 165 A1.

Two further, similar dual-clutch transmissions, but respectively with one countershaft or with two countershafts arranged coaxially behind one other, are also known from U.S. Pat. No. 7,621,839 B2 and from U.S. Pat. No. 7,913,581 B2 respectively.

SUMMARY OF THE INVENTION

Against this background the purpose of the present invention is to propose a dual-clutch transmission with a range group, whose forward gears including one involving a range group shift can all be powershifted and which, in relation to the number of gears, requires fewer components and has a compact structure.

The invention is based on the recognition that in a dual-clutch transmission with a main group and with a range group in drive connection downstream from the main group, the range group can be shifted between two gears that belong respectively to a lower gear range and an upper gear range without traction force interruption in the drive-train if, by means of a shifting device, a supporting gear between the two gear ranges is produced, which bridges across the range group between the main transmission and the drive output of the transmission. By virtue of shiftable shaft connections and the range group, in a compact structure with a range group that can be bridged across in such a manner it should be possible to produce as many usable gears as possible in a powershiftable vehicle transmission, for example for commercial vehicles.

Accordingly, the invention starts from a dual-clutch transmission having two clutches, whose input sides are connected to a drive input shaft and whose output sides are connected, respectively, to one of two transmission input shafts, wherein one transmission input shaft is in the form of a radially inner solid shaft which is fitted and able to rotate inside the axially shorter, second transmission input shaft in the form of a hollow shaft, having also at least two countershafts one of which is a radially inner, solid shaft fitted and able to rotate inside an axially shorter, outer hollow shaft, having also a drive output shaft coaxial with and arranged behind the drive input shaft, having also a main shaft arranged coaxially between the inner transmission input shaft and the drive output shaft, having also a multiple-gear main group comprising a plurality of forward gearwheel planes, having also a multiple-gear range group in drive connection downstream from the main group and having a plurality of shifting elements for shifting transmission elements and/or for forming transmission element connections in which a first transmission element of the main group is connected to a first transmission element of the range group and in which a second transmission element of the main group can be connected by means of a shifting element to a second transmission element of the range group, which element is or can be connected to the drive output shaft.

To achieve the stated objective, in this transmission the invention furthermore provides that on the outer countershaft at least three fixed wheels are arranged, each of which meshes with a respective loose wheel and the two countershafts can be connected to one another in a rotationally fixed manner by means of a shifting element that can be actuated on one side, wherein the loose wheel closest to the shifting element is mounted to rotate on the main shaft and can be connected thereto in a rotationally fixed manner, the loose wheel farthest from the shifting element is mounted to rotate on the inner transmission input shaft and can be connected rotationally fixed thereto, and a central loose wheel is arranged and able to rotate axially between the other two loose wheels and can be connected rotationally fixed to the inner transmission input shaft, to the main shaft, or to both those shafts.

Thus, the invention describes a dual-clutch gear system which comprises few components and wheel planes, wherein all the forward gears in a sequential series of gearshifts can be powershifted, including a range group shift. In this way range shifts with a long shifting time, which affect driving comfort adversely, can advantageously be avoided. The number of forward gears that can be powershifted exceeds twice the number of forward gearwheel planes in the main group, without the need for an upstream splitter group or an additional hollow shaft fitted on the main shaft.

A particularly compact structure with numerous shifting options is achieved with this transmission in that one of the two transmission input shafts is in the form of a radially inner solid shaft and the other transmission input shaft is an axially shorter, outer hollow shaft arranged coaxially over the inner transmission input shaft in such manner that the inner transmission input shaft projects out of the outer transmission input shaft on both sides. Furthermore a main shaft is provided, which is arranged coaxially with and axially between the inner transmission input shaft and the drive output shaft. In addition, one of the two countershafts is in the form of a radially inner solid shaft and the other countershaft is an axially shorter, outer hollow shaft fitted coaxially over the inner countershaft in such manner that the inner countershaft projects out of the outer, hollow countershaft on both sides and the two countershafts can be coupled to one another by means of a shifting element that can be actuated on one side.

This arrangement enables an effective multiple use of the shifting elements, gearwheels and shaft connections provided. Basically, in each case a plurality of fixed and/or loose wheels can be arranged on the two countershafts, with the countershaft formed as a hollow shaft supporting at least three fixed wheels. Preferably, only fixed wheels are arranged on the two countershafts apart from the one-side-acting shifting element for coupling the two countershafts to one another, whereas all the shifting elements of the main group are arranged on the transmission input shaft and the main shaft. The arrangement of the countershafts coaxially one over the other limits the radial diameter of the transmission.

The invention makes available a transmission gear arrangement which, with only five forward gearwheel planes and a two-stage range group, provides eleven powershiftable forward gears of which at least one forward gear can be engaged and used independently of the shift condition of the range group. To be specific, the first forward-gear gearwheel plane comprises two meshing fixed wheels which form an input constant, wherein the first fixed wheel is connected rotationally fixed to the outer transmission input shaft and the second fixed wheel is connected rotationally fixed to the inner countershaft, the second forward-gear gearwheel plane comprises a loose wheel which meshes with a fixed wheel, wherein the loose wheel is mounted to rotate on the inner transmission input shaft but can be connected rotationally fixed thereto by means of a shifting element, whereas the associated fixed wheel is arranged rotationally fixed on the outer countershaft, the third forward-gear gearwheel plane comprises a loose wheel which meshes with a fixed wheel, wherein the loose wheel is positioned and can rotate axially between the inner transmission input shaft and the main shaft and can be connected rotationally fixed by a shifting element to the inner transmission input shaft and also, by another shifting element, to the main shaft, the associated fixed wheel being arranged rotationally fixed on the outer countershaft, the fourth forward-gear gearwheel plane comprises a loose wheel which meshes with a fixed wheel, wherein the loose wheel is mounted to rotate on the main shaft but cab be connected rotationally fixed thereto by a shifting element, whereas the associated fixed wheel is arranged rotationally fixed on the outer countershaft, and the fifth forward-gear gearwheel plane comprises a loose wheel which meshes with a fixed wheel, wherein the loose wheel is mounted to rotate on the main shaft and can be connected rotationally fixed thereto by a shifting element, whereas the associated fixed wheel is arranged on the inner countershaft in a rotationally fixed manner.

In order to provide a relatively large overall spread of the transmission, an essentially geometric gradation can be realized, which is adapted to the higher gears in the direction of a partially progressive gradation variation.

Moreover, it can be provided that the range group is in the form of a planetary gearset with a central sun gear, an outer ring gear and a planetary carrier, wherein the planetary carrier guides a plurality of planetary gearwheels that mesh with the sun gear and with the ring gear. In this case the sun gear functions as a first transmission element of the range group which is connected to the main shaft that functions as the first transmission element of the main group, whereas the planetary carrier functions as the second transmission element of the range group, which is connected rotationally fixed to the drive output shaft and can be connected by means of a shifting element arranged between the range group and an adjacent forward-gear gearwheel plane to a loose wheel of the forward-gear gearwheel plane which is mounted to rotate on the main shaft and can be connected rotationally fixed thereto by a shifting element, which functions as the second transmission element of the main group, and in which the ring gear can be connected by a shifting element to a positionally fixed component and can also be coupled by a shifting element to the planetary carrier.

By virtue of the shiftable coupling of a loose wheel or gearwheel to the drive output shaft via the planetary carrier a drive torque is transmitted to the drive output, independently of a shift in the range group between a lower and an upper gear range. In this way the range group can be bridged in a particular gear in a powershifted manner. Since in the gear the range group is not involved in the power flow, in that gear it can be shifted while free from load, without traction force interruption. In the next gear the power flow then takes place again by way of the range group in the then engaged upper or lower gear range.

In an example shifting sequence of the eleven-gear transmission according to the invention, the powershifted bridging of the range group can be realized in that the eighth forward gear can be engaged by forming a connection between the planetary carrier of the range group and the adjacent loose wheel of the fifth forward-gear wheel plane. Thus, the eighth gear acts as a supporting gear during a range group shift.

In addition, it can be provided that the seventh forward gear can be used as the highest gear of the lower gear range by forming a direct connection between the inner transmission input shaft and the main shaft and by engaging a lower transmission stage in the range group.

Thus in the seventh gear the drive power in the main group is transmitted directly from the associated transmission input shaft to the main shaft and converted in the range group. In that gear the conversion therefore takes place only by the range group. In the eighth gear the range group can then be shifted to the upper gear range. Conversely, starting from the ninth gear the range group can be shifted to the lower gear range in the eighth gear.

Furthermore, it can be provided that the eleventh forward gear can be used as a direct gear by forming a direct connection between the inner transmission input shaft and the main shaft and by engaging an upper transmission stage in the range group. This enables a direct, powershiftable straight-through connection to the drive output, which has a high efficiency.

In addition a reversing-gear wheel plane can be provided, which is arranged axially between the fourth and fifth forward-gear wheel planes and which comprises a loose wheel, a fixed wheel and a gearwheel for reversing the rotation direction, which is mounted to rotate freely and which meshes with both the loose wheel and the fixed wheel. The loose wheel of this reversing-gear wheel plane is mounted to rotate on the main shaft and can be connected thereto in a rotationally fixed manner by a shifting element, whereas the associated fixed wheel is arranged rotationally fixed on the inner countershaft.

In this way, in combination with the two clutches and by coupling the two countershafts and the range group, a total of six reversing gears can be used, most of which can be powershifted. Accordingly, the reversing-gear wheel plane provided can advantageously be connected upstream from the last of the forward-gear wheel planes, so that the last forward-gear wheel plane can be engaged for the direct coupling of the main group to the drive output, i.e. for bridging the range group.

The eleven-gear transmission according to the invention needs only ten shifting elements, eight of them associated with the main group and two with the range group. So far as possible the shifting elements are combined two shifting elements at a time in shifting devices that can be actuated on both sides, in order to save both space and costs. For example, an arrangement with six shifting positions is possibly, wherein one shifting device is associated with the radially inner transmission input shaft, a second and a third shifting device with the main shaft, and a fourth shifting device with the range group. For the shiftable coupling of the main group to the range group, preferably a shifting element actuated on one side is provided. Likewise, for the coupling of the two countershafts a shifting element actuated on one side is present. The two shifting elements actuated on one side then form the fifth and sixth shifting positions of the dual-clutch transmission.

BRIEF DESCRIPTION OF THE DRAWINGS

For the further clarification of the invention a drawing of an example embodiment is attached, which shows:

FIG. 2: An example shifting scheme for the dual-clutch transmission in FIG. 1.

DETAILED DESCRIPTION OF THE PREFERRED EMBODIMENTS

Figure 1:
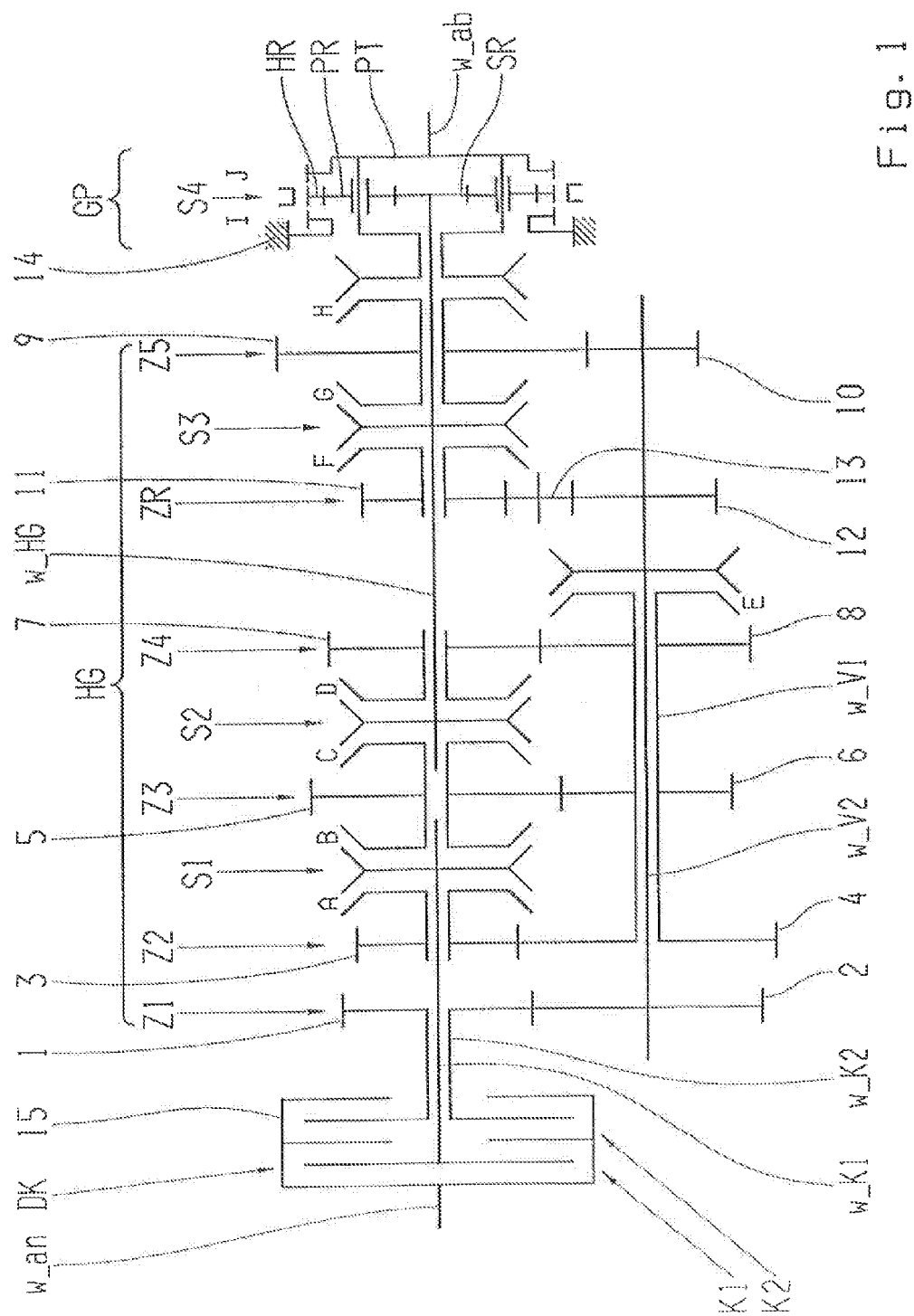
FIG. 1: A schematic view of a dual-clutch transmission according to the invention.

According to these, the dual-clutch transmission shown in FIG. 1 comprises a main group HG of countershaft design with a plurality of spur gear stages and shifting devices, and a range group GP of planetary design, which are arranged coaxially with respect to one another. In addition a dual clutch DK with two clutches K1, K2 is provided, whose input sides are formed by a common clutch cage 15. The clutch cage 15 is connected in a rotationally fixed manner to a driveshaft w_an of a drive engine (not shown). The output sides of the dual clutch DK are respectively connected to two transmission input shafts w_K1, w_K2 arranged coaxially with one another. The transmission input shaft w_K1 of the first clutch K1 is in the form of an inner, solid shaft which projects on the transmission side out of the transmission input shaft w_K2 of the second clutch K2, which is in the form of an outer, hollow shaft. Coaxially with the two transmission input shafts w_K1, w_K2 and axially adjacent to the first transmission input shaft w_K1 is arranged a main shaft w_HG associated with the main transmission HG. Furthermore there are two countershafts w_V1, w_V2, the first of which w_V1 is in the form of a hollow shaft inside which the second countershaft w_V2, in the form of a solid shaft, is fitted to rotate and which projects axially on both sides out of the hollow shaft w_V1.

The main group HG comprises five forward-gearwheel planes Z1, Z2, Z3, Z4, Z5 and a reversing-gear wheel plane ZR, in each case with associated spur gears. In the first forward-gear wheel plane Z1 a fixed wheel 1 fixed on the second transmission input shaft w_K2 meshes with a fixed wheel 2 fixed on the second countershaft w_V2. The forward-gear wheel plane Z1 acts as an input constant of the second clutch K2 and the second transmission input shaft w_K2. In the second forward-gearwheel plane Z2 a loose wheel 3 arranged on the first transmission input shaft w_K1 meshes with a fixed wheel 4 fixed on the first countershaft w_V1. In the third forward-gear wheel plane Z3 a second loose wheel 5 mounted to rotate on the first transmission input shaft w_K1 and the main shaft w_HG meshes with a second fixed wheel 6 fixed on the first countershaft w_V1. In the fourth forward-gear wheel plane Z4 a loose wheel 7 mounted to rotate on the main shaft w_HG meshes with a third fixed wheel 8 arranged rotationally fixed on the first countershaft w_V1. In the fifth forward-gear wheel plane Z5 a loose wheel 9 mounted to rotate on the main shaft w_HG meshes with a fixed wheel 10 on the second countershaft w_V2, Between the fourth forward-gear wheel plane Z4 and the fifth forward-gear wheel plane Z5 is arranged a reversing-gearwheel plane ZR, in which a loose wheel 11 mounted to rotate on the main shaft w_HG and a fixed wheel 12 on the second countershaft w_V2 mesh with a rotatably mounted rotation direction reversing gearwheel 13.

The range group GP comprises a central sun gear SR, an outer ring gear HR and a planetary carrier PT, which guides a plurality of planetary gearwheels PR that mesh with the sun gear SR and the ring gear HR. The sun gear SR is connected in a rotationally fixed manner to the output end of the main shaft w_HG. On the output side a drive output shaft w_ab is arranged coaxially with the main shaft w_HG and the two transmission input shafts w_K1, w_K2. The drive output shaft w_ab is connected rotationally fixed to the output end of the planetary carrier PT.

To engage the transmission elements in the form of loose wheels 3, 5, 7, 9, 11 and shiftable planetary gearset components HR, PT, and to form connections of the shiftable transmission elements in the form of shafts w_K1, w_K2, w_V1, w_V2, four double-sided or alternately actuated shifting devices S1, S2, S3, S4 with eight shifting elements A, B, C, D, F, G, I, J and two shifting devices E, H that act on one side are provided.

In the example embodiment shown, the shifting elements A, B, C, D, E, F, G, H of the main group HG are designed with synchronizers and the shifting elements I, J of the range group are in the form of claw clutches.

The first shifting device S1 serves alternatively for coupling the loose wheel 3 of the second forward-gear wheel plane Z2 to the first transmission input shaft w_K1 by means of the first shifting element A and for coupling the loose wheel 5 of the third forward-gear wheel plane Z3 to the first transmission input shaft w_K1 by means of the second shifting element B.

The second shifting device S2 serves alternatively for coupling the loose wheel 5 of the third forward-gear wheel plane Z3 to the main shaft w_HG by means of the third shifting element C and for coupling the loose wheel 7 of the fourth forward-gear wheel plane Z4 to the main shaft w_HG by means of the fourth shifting element D. By engaging the second shifting element B and the third shifting element C, a direct connection of the first transmission input shaft w_K1 to the main shaft w_HG can be formed.

The third shifting device S3 serves alternatively for coupling the loose wheel 11 of the reversing-gear wheel plane ZR to the main shaft w_HG by means of the sixth shifting element F and for coupling the loose wheel 9 of the fifth forward-gear wheel plane Z5 to the main shaft w_HG by means of the seventh shifting element G.

The fourth shifting device S4 associated with the range group GP serves alternatively for coupling the ring gear HR to a positionally fixed component or housing component 14 by means of the ninth shifting element I and for coupling the ring gear HR to the planetary carrier PT by means of the tenth shifting element J. By virtue of the coupling with the housing 14, a short gear ratio of the planetary transmission GP is engaged, for the use of a lower gear range. By the coupling to the planetary carrier PT the planetary gearset GP is blocked, so that a direct gear or direct connection between the main shaft w_HG and the drive output shaft w_ab is obtained.

The fifth shifting element E, which only acts on one side, can be used as a coupling device for the rotationally fixed coupling of the two countershafts w_V1 w_V2.

The eighth shifting element H, which also acts on only one side, is designed for the direct coupling of the loose wheel 9 of the fifth forward-gear wheel plane Z5 to the planetary carrier PT and thereby for the direct coupling of the loose wheel 9 to the drive output shaft w_ab. By means of this shifting element H, independently of the shifting conditions of the associated shifting device S4 the range group GP can be bridged to the drive output shaft w_ab. In that case the power is transmitted by way of the second clutch K2, the first forward-gear wheel plane Z1 as the driving spur gear stage, the second countershaft w_V2 and the fifth forward-gear wheel plane Z5 as the driven spur gear stage. The planetary gearset GP rotates in a neutral position of the associated shifting device S4 and with the connection between the first transmission input shaft w_K1 and the main shaft w_HG, or open first clutch K1, also in the lower transmission ratio when the shifting element I is activated and in the upper transmission ratio when the shifting element J is activated, without power transmission, and can therefore be shifted while free from load.

The dual-clutch transmission described above enables at least eleven powershiftable forward gears V1, V2, V3, V4, V5, V6, V7, V8, V9, V10, V11, and six partly powershiftable reversing gears R1, R2, R3, R4, R5, R6. The attached FIG. 2 shows an example of a shifting scheme for this. In the table of FIG. 2 the shifting elements activated in each case are marked by as dot. According to the table, the shifts take place in alternation by way of the two clutches K1, K2, beginning with the first clutch K1 In the first seven gears the lower transmission ratio of the range group GP is activated, as made clear by the dots in column I. As necessary, the two countershafts w_V1, w_V2 are coupled to one another, which is done by engaging the shifting element E. Gearshifts within the main group HG take place without traction force interruption in a known manner by preselecting the respective next gear and then, with a time overlap, opening the clutch K1 or K2 of the active gear and closing the clutch K2 or K1, respectively, of the new gear.

The seventh forward gear is designed to be the highest gear of the lower gear range. In that gear the transmission input shaft w_K1 is directly connected to the main shaft w_HG by means of the relevant activated shifting elements B, C. The gear ratio of that gear corresponds to the lower transmission ratio of the range group GP.

In the eighth forward gear V8 the range group GP is bridged by engaging the shifting element H. The power flow passes by way of the second clutch K2, the first forward-gear wheel plane Z1, the fifth first forward-gear wheel plane Z5 and via the planetary carrier PT coupled by the eighth shifting element H to the fifth first forward-gear wheel plane Z5, to the drive output shaft w_ab. In this eighth forward gear V8 the range group is not involved in the power flow and can therefore be shifted while free from load to the upper gear range or the block rotation for the next (ninth forward gear V9). The ninth forward gear V9 is then activated without traction force interruption by closing the first clutch K1 and opening the second clutch K2, comparably to a gearshift within the main group HG.

The tenth and eleventh forward gears V10, V11 are in turn engaged within the main group HG, the eleventh gear V11 being designed as a direct gear and obtained by engaging the shifting elements B and C while the shifting element J is also engaged.

The six reversing gears R1, R2, R3, R4, R5, R6 are formed by the reversing-gear wheel plane ZR, wherein the two countershafts w_V1, w_V2 are mutually coupled. The change between the third reversing gear R3 and the fourth reversing gear R4, during which the range group GP is shifted, takes place with traction force interruption since both of the gears R3, R4 are supplied with torque by way of the same clutch K1. The other reversing gearshifts can be carried out as powershifts.

INDEXES

1 Fixed wheel on the second transmission input shaft
2 Fixed wheel on the second countershaft
3 Loose wheel on the first transmission input shaft
4 Fixed wheel on the first countershaft
5 Loose wheel on the first transmission input shaft
6 Fixed wheel on the first countershaft
7 Loose wheel on the main shaft
8 Fixed wheel on the first countershaft
9 Loose wheel on the main shaft
10 Fixed wheel on the second countershaft
11 Loose wheel on the main shaft
12 Fixed wheel on the second countershaft
13 Gearwheel for reversing the rotation direction
14 Positionally fixed component
15 Dual clutch cage
A Shifting element
B Shifting element
C Shifting element
D Shifting element
E Shifting element
F Shifting element
G Shifting element
H Shifting element
I Shifting element
J Shifting element
DK Dual clutch
GP Range group
HG Main group
HR Ring gear
PR Planetary gearwheel
PT Planetary carrier
SR Sun gear
K1 First clutch
K2 Second clutch
R1 First reversing gear
R2 Second reversing gear
R3 Third reversing gear
R4 Fourth reversing gear
R5 Fifth reversing gear
R6 Sixth reversing gear
S1 First shifting device
S2 Second shifting device
S3 Third shifting device
S4 Fourth shifting device
V1 First forward gear
V2 Second forward gear
V3 Third forward gear
V4 Fourth forward gear
V5 Fifth forward gear
V6 Sixth forward gear
V7 Seventh forward gear
V8 Eighth forward gear
V9 Ninth forward gear
V10 Tenth forward gear
V11 Eleventh forward gear
Z1 First forward-gear wheel plane
Z2 Second forward-gear wheel plane
Z3 Third forward-gear wheel plane
Z4 Fourth forward-gear wheel plane
Z5 Fifth forward-gear wheel plane
ZR Reversing-gear wheel plane
w_an Drive input shaft
w_ab Drive output shaft
w_HG Main shaft
w_K1 First transmission input shaft
w_K2 Second transmission input shaft
w_V1 First countershaft
w_V2 Second countershaft

The invention claimed is:

1. A dual-clutch transmission with two clutches (K1, K2), whose input sides are connected to a drive input shaft (w_an) and whose output sides are respectively connected to one of two transmission input shafts (w_K1, w_K2), one transmission input shaft (w_K1) is a radially inner solid shaft which is held and able to rotate inside an axially shorter, second transmission input shaft (w_K2) made as a hollow shaft, at least two countershafts (w_V1, w_V2) of which one countershaft (w_V1, w_V2) is a radially inner solid shaft and is held and able to rotate inside an axially shorter, outer hollow shaft, a drive output shaft (w_ab) arranged axially behind the drive input shaft (w_an), a main shaft (w_HG) arranged coaxially between the inner transmission input shaft (w_K1) and the drive output shaft (w_ab), a multiple-gear main group (HG) in which a plurality of forward-gearwheel planes (Z1, Z2, Z3, Z4, Z5) are provided, a multi-gear range group (GP) in drive connection with and located downstream from the main group (HG), a plurality of shifting elements (A, B, C, D, E, F, G, H, I, J) for at least one of shifting transmission elements (3, 5, 7, 9, 11, HR, PT, w_K1, w_HG, w_V1, w_V2) and forming transmission element connections, a first transmission element (w_HG) of the main group (HG) is connected to a first transmission element (SR) of the range group (GP), and a second transmission element (9) of the main group (HG) is connectable, by an intermediate shifting element (H), to a second transmission element (PT) of the range group (GP) which is connected to the drive output shaft (w_ab), at least three fixed wheels (4, 6, 8) are arranged on the outer countershaft (w_V1), each of which meshes with a respective loose wheel (3, 5, 7), and the two countershafts (w_V1, w_V2) are connectable to one another, in a rotationally fixed manner, by a shifting element (E) that is actuatable on one side, wherein a third loose wheel (7), closest to the shifting element (E) that is actuatable on one side, is mounted to rotate on the main shaft (w_HG) and is connectable thereto in a rotationally fixed manner, a first loose wheel (3), furthest from the shifting element (E) that is actuatable on one side, is mounted to rotate on the inner transmission input shaft (w_K1) and is rotationally fixedly connectable thereto, and a central second loose wheel (5), located between the closest and the furthest loose wheels (3, 7), is mounted to rotate and is connectable, in a rotationally fixed manner, to at least one of the inner transmission input shaft (w_K1) and the main shaft (w_HG).

2. The dual-clutch transmission according to claim 1 wherein the plurality of forward-gear wheel planes of the main group (HG) comprises first, second, third, fourth, and fifth forward-gear wheel planes (Z1, Z2, Z3, Z4, Z5) and two transmission ratio steps in the range group (GP), at least eleven powershiftable forward gears (V1, V2, V3, V4, V5, V6, V7, V8, V9, V10, V11) can be implemented such that at least one forward gear (V8) can be implemented independently of shift conditions of the range group (GP).

3. The dual-clutch transmission according to claim 1, wherein a first forward-gear wheel plane (Z1), of the plurality of forward-gearwheel planes, comprises first and second meshing fixed wheels (1, 2) which form an input constant, the first fixed wheel (1) is rotationally fixedly connected to the outer transmission input shaft (w_K2) and the second fixed wheel (2) is rotationally fixedly connected to the inner countershaft (w_V2), a second forward-gear wheel plane (Z2), of the plurality of forward-gear wheel planes, comprises the first loose wheel (3) and a first fixed wheel (4) that meshes with therewith, the first loose wheel (3) of the second forward-gear wheel plane (Z2) is mounted to rotate on the inner transmission input shaft (w_K1) and is connectable thereto, in a rotationally fixed manner, by a first shifting element (A), and the first fixed wheel (4) is rotationally fixedly attached to the outer countershaft (w_V1), a third forward-gear wheel plane (Z3), of the plurality of forward-gear wheel planes, comprises the second loose wheel (5) which meshes with a second fixed wheel (6), the second loose wheel (5) of the third forward-gear wheel plane (Z3) is mounted to rotate axially between the inner transmission input shaft (w_K1) and the main shaft (w_HG) and is connectable rotationally fixed to the inner transmission input shaft (w_K1) by a second shifting element (B) and is connectable rotationally fixed to the main shaft (w_HG) by a third shifting element (C), and the second fixed wheel (6) is attached rotationally fixed on the outer countershaft (w_V1), a fourth forward-gear wheel plane (Z4), of the plurality of forward-gear wheel planes, comprises the third loose wheel (7) which meshes with a third fixed wheel (8), the loose wheel (7) of the fourth forward-gear wheel plane is mounted to rotate on the main shaft (w_HG) and is rotationally fixedly connectable thereto by a fourth shifting element (D), and the third fixed wheel (8) is rotationally fixedly attached on the outer countershaft (w_V1), and a fifth forward-gear wheel plane (Z5), of the plurality of forward-gear wheel planes, comprises a fourth loose wheel (9) which meshes with a fourth fixed wheel (10), the fourth loose wheel (9) of the fifth forward-gear wheel plane is mounted to rotate on the main shaft (w_HG) and is rotationally fixedly connectable thereto by a fifth shifting element (G), and the fifth fixed wheel (10) is arranged on the inner countershaft (w_V2) in a rotationally fixed manner.

4. The dual-clutch transmission according to claim 1, wherein a gradation course is provided which, during a shift sequence, changes from an essentially geometrical gear gradation to an essentially progressive gear gradation.

5. The dual-clutch transmission according to claim 1, wherein a planetary gearset with a central sun gear (SR), an outer ring gear (HR) and a planetary carrier (PT) are arranged in the range group (GP), the planetary carrier (PT) supports a plurality of planetary gearwheels (PR) that mesh with the sun gear (SR) and the ring gear (HR), the sun gear (SR) is the first transmission element of the range group (GP), which is connected to the main shaft (w_HG) and functions as the first transmission element of the main group (HG), the planetary carrier (PT) is the second transmission element of the range group (GP) which is rotationally fixedly connected to the drive output shaft (w_ab) and, by the intermediate shifting element (H) arranged axially between the range group (GP) and an adjacent forward-gear wheel plane (Z5), is connectable to a fourth loose wheel (9) of the forward-gear wheel plane (Z5), which is mounted to rotate on the main shaft (w_HG) and is rotationally fixedly connectable thereto by the fifth shifting element (G), and which functions as the second transmission element of the main group (HG), and the ring gear (HR) is couplable by:

a first group shifting element (I) to a positionally fixed component (14), and a second group shifting element (J) to the planetary carrier (PT).

6. The dual-clutch transmission according to claim 1, wherein a seventh forward gear (V7) is engagable as a highest gear of a lower gear range by engaging a direct connection of the inner transmission input shaft (w_K1) with the main shaft (w_HG) and shifting to a lower transmission ratio step of the range group (GP).

7. The dual-clutch transmission according to claim 1, wherein an eleventh forward gear (V11) is engagable as a direct gear by engaging a direct connection of the inner transmission input shaft (w_K1) with the main shaft (w_HG) and shifting to an upper transmission ratio step of the range group (GP).

8. The dual-clutch transmission according to claim 1, wherein an eighth forward gear (V8) is engagable, independently of shift conditions of the range group (GP), by engaging a connection between the planetary carrier (PT) of the range group (GP) and a fourth loose wheel (9) of a fifth forward-gear wheel plane (Z5).

9. The dual-clutch transmission according to claim 1, wherein a reversing-gear wheel plane (ZR) is provided, which is arranged axially between a fourth forward-gear wheel plane (Z4) and a fifth forward-gear wheel plane (Z5), the reversing-gear wheel plane (ZR) comprises a reversing loose wheel (11) and a reversing fixed wheel (12) and a rotatably mounted rotation direction reversing gearwheel (13) meshes with the reversing loose wheel (11) and reversing fixed wheel (12), the reversing loose wheel (11) of the reversing-gear wheel plane is arranged to rotate on the main shaft (w_HG) and is connectable rotationally fixedly connectable thereto by a sixth shifting element (F), and the reversing fixed wheel (12) is arranged rotationally fixed on the inner countershaft (w_V2), whereby six partially powershiftable reversing gears can be implemented.

10. The dual-clutch transmission according to claim 1, wherein ten shifting elements (A, B, C, D, E, F, G, H, I, J) are provided so that eight shifting elements (A, B, C, D, E, F, G, H) are associated with the main group (HG) and two shifting elements (I, J) are associated with the range group (GP), six of the shifting elements (A, B, C, D, E, F) of the main group (HG) are combined in shifting devices (S1, S2, S3) that can be actuated on both sides, each with two respective shifting elements (A-B, C-D, E-F), and the two shifting elements (I, J) of the range group (GP) are combined in a further shifting device (S4) that can be actuated on both sides.

11. A dual-clutch transmission comprising:
first and second clutches (K1, K2), each of the first and the second clutches having an input side and an output side, the input sides are connected to a drive input shaft (w_an), the output side of the first clutch is connected to an inner transmission input shaft and the output side of the second clutch is connected to an outer transmission input shaft, the inner transmission input shaft (w_K1) is a radially inner solid shaft which is held and able to rotate inside the outer transmission input shaft which is an axially shorter and hollow shaft;
outer and inner countershafts (w_V1, w_V2), the inner countershaft is a radially inner solid shaft which is held and able to rotate inside the outer countershaft which is an axially shorter, hollow shaft;
a drive output shaft (w_ab) arranged axially behind the drive input shaft (w_an), and a main shaft (w_HG) arranged coaxially between the inner transmission input shaft (w_K1) and the drive output shaft (w_ab);
a multiple-gear main group (HG) having a plurality of forward-gear wheel planes (Z1, Z2, Z3, Z4, Z5) and a multi-gear range group (GP) in drive connection downstream from the main group (HG);
a plurality of shifting elements (A, B, C, D, E, F, G, H, I, J) for at least one of shifting transmission elements (3, 5, 7, 9, 11, HR, PT, w_K1, w_HG, w_V1, w_V2) and forming transmission element connections;
a main shaft (w_HG) of the main group (HG) is connected to a first transmission element (SR) of the range group (GP);
a second transmission element (9) of the main group (HG) is connectable, via a first shifting element (H), to a second transmission element (PT) of the range group (GP) which is connected to the drive output shaft (w_ab);
the outer countershaft (w_V1) comprises first, second and third fixed wheels (4, 6, 8), each of the first, the second and the third fixed wheels of the outer countershaft meshing with a respective first, second and third loose wheel (3, 5, 7), the outer and the inner countershafts (w_V1, w_V2) are connectable, in a rotationally fixed manner, by a second shifting element (E), and the second shifting element being actuated on one side;
the third loose wheel (7) is axially closest to the second shifting element (E), and is mounted to rotate on the main shaft (w_HG) and is connectable so as to be rotationally fixed to the main shaft;
the first loose wheel (3) is axially furthest from the second shifting element (E), and is mounted to rotate on the inner transmission input shaft (w_K1) and is connectable so as to be rotationally fixed the inner transmission input shaft; and
the second loose wheel (5) is arranged axially between the first and the third loose wheels (3, 7), and is mounted to rotate and is connectable, in a rotationally fixed manner, to at least one of the inner transmission input shaft (w_K1) and the main shaft (w_HG).

12. The dual-clutch transmission according to claim 11, wherein the plurality of forward-gear wheel planes of the main group comprises first, second, third, fourth and fifth forward-gear wheel planes (Z1, Z2, Z3, Z4, Z5) and the range group comprises two transmission ratio steps, the first and the second clutches and the plurality of shifting elements being selectively engageable such that at least eleven powershiftable forward gears (V1, V2, V3, V4, V5, V6, V7, V8, V9, V10, V11) can be implemented and at least one forward gear (V8) can be implemented independently of shift conditions of the range group (GP).

13. The dual-clutch transmission according to claim 11, wherein the plurality of forward-gear wheel planes of the main group comprises first, second, third, fourth and fifth forward-gear wheel planes (Z1, Z2, Z3, Z4, Z5);
the first forward-gear wheel plane (Z1) comprises a fourth fixed wheel (1) that is connected rotationally fixed to the outer transmission input shaft (w_K2) and a fifth fixed wheel (2) is connected rotationally fixed to the inner countershaft (w_V2), the fourth and the fifth fixed wheels mesh and form an input constant;
the second forward-gear wheel plane (Z2) comprises the first loose wheel and the first fixed wheel (4) that meshes therewith, the first loose wheel (3) is mounted to rotate on the inner transmission input shaft (w_K1) and is connectable thereto in a rotationally fixed manner by a third shifting element (A), and the first fixed wheel (4) is attached rotationally fixed to the outer countershaft (w_V1);
the third forward-gear wheel plane (Z3) comprises the second loose wheel (5) which meshes with the second fixed wheel (6), the second loose wheel (5) is mounted to rotate axially between the inner transmission input shaft (w_K1) and the main shaft (w_HG) and is rotationally fixedly connectable to the inner transmission input shaft (w_K1) by a fourth shifting element (B) and is rotationally fixedly connectable to the main shaft (w_HG) by a fifth shifting element (C), and the second fixed wheel (6) is rotationally fixedly attachable on the outer countershaft (w_V1);
the fourth forward-gear wheel plane (Z4) comprises the third loose wheel (7) which meshes with the third fixed wheel (8), the third loose wheel (7) is mounted to rotate on the main shaft (w_HG) and is connectable rotationally fixed thereto by a sixth shifting element (D), and the third fixed wheel (8) is rotationally fixedly attachable on the outer countershaft (w_V1); and
the fifth forward-gear wheel plane (Z5) comprises the second transmission element which is a fourth loose wheel (9) that meshes with a sixth fixed wheel (10), the fourth loose wheel (9) is mounted to rotate on the main shaft (w_HG) and is rotationally fixedly connectable thereto by a seventh shifting element (G), and the sixth fixed wheel (10) is arranged on the inner countershaft (w_V2) in a rotationally fixed manner.

14. The dual-clutch transmission according to claim 11, wherein a gradation course is provided, which during a sequence, changes from an essentially geometrical gear gradation to an essentially progressive gear gradation.

15. The dual-clutch transmission according to claim 13, wherein the range group (GP) is a planetary gearset comprising a central sun gear (SR), an outer ring gear (HR) and a planetary carrier (PT) which supports a plurality of planetary gearwheels (PR) that mesh with the sun gear (SR) and the ring gear (HR);

the sun gear (SR) is the first transmission element of the range group (GP), and is connected to the main shaft (w_HG) of the main group (HG);

the planetary carrier (PT) is the second transmission element of the range group (GP), and is rotationally fixedly connected to the drive output shaft (w_ab) and, by the first shifting element (H) arranged axially between the range group (GP) and an adjacent forward-gear wheel plane (Z5), is connectable to the fourth loose wheel (9) of the fifth forward-gear wheel plane (Z5), which is mounted to rotate on the main shaft (w_HG) and is connectable rotationally fixed thereto by the seventh shifting element (G), and the ring gear (HR) is couplable by an eighth shifting element (I) to a positionally fixed component (14) and by a ninth shifting element (J) to the planetary carrier (PT).

16. The dual-clutch transmission according to claim 11, wherein a seventh forward gear (V7) is engagable as a highest gear of a lower gear range by engaging a direct connection of the inner transmission input shaft (w_K1) with the main shaft (w_HG) and shifting to a lower transmission ratio step of the range group (GP).

17. The dual-clutch transmission according to claim 11, wherein an eleventh forward gear (V11) is engagable as a direct gear by engaging a direct connection of the inner transmission input shaft (w_K1) with the main shaft (w_HG) and shifting to an upper transmission ratio step of the range group (GP).

18. The dual-clutch transmission according to claim 15, wherein an eighth forward gear (V8) is engagable independently of shift conditions of the range group (GP) by engaging a connection between the planetary carrier (PT) of the range group (GP) and the fourth loose wheel (9) of the fifth forward-gear wheel plane (Z5).

19. The dual-clutch transmission according to claim 15, wherein a reversing-gear wheel plane (ZR) is arranged axially between the fourth forward-gear wheel plane (Z4) and the fifth forward-gear wheel plane (Z5), the reversing-gear wheel plane (ZR) comprises a fifth loose wheel (11) and a seventh fixed wheel (12) and, a rotatably mounted rotation direction reversing gearwheel (13) meshes with the fifth loose wheel (11) and the seventh fixed wheel (12), the fifth loose wheel (11) is arranged to rotate on the main shaft (w_HG) and is connectable rotationally fixed thereto by a tenth shifting element (F), and the seventh fixed wheel (12) is arranged rotationally fixed on the inner countershaft (w_V2), whereby six, partially powershiftable reversing gears can be implemented.

20. The dual-clutch transmission according to claim 11, wherein the first, the second and third, fourth, fifth, sixth, seventh, eighth, ninth and tenth shifting elements (A, B, C, D, E, F, G, H, I, J) are provided, the main group (HG) comprises the first, the second, the third, the fourth, the fifth, the sixth, the seventh, and the eighth shifting elements (A, B, C, D, E, F, G, H) and the range group (GP) comprises the ninth and tenth shifting elements (I, J), the second, the third, the fourth, the fifth, the sixth, the seventh of the shifting elements (A, B, C, D, E, F) of the main group (HG) are combined in first, second and third shifting devices (S1, S2, S3) that are actuatable on both sides, each with two respective shifting elements (A-B, C-D, E-F), and the ninth and tenth shifting elements (I, J) of the range group (GP) are combined in a further shifting device (S4) that is actuatable on both sides.

\* \* \* \* \*